Figure 1:
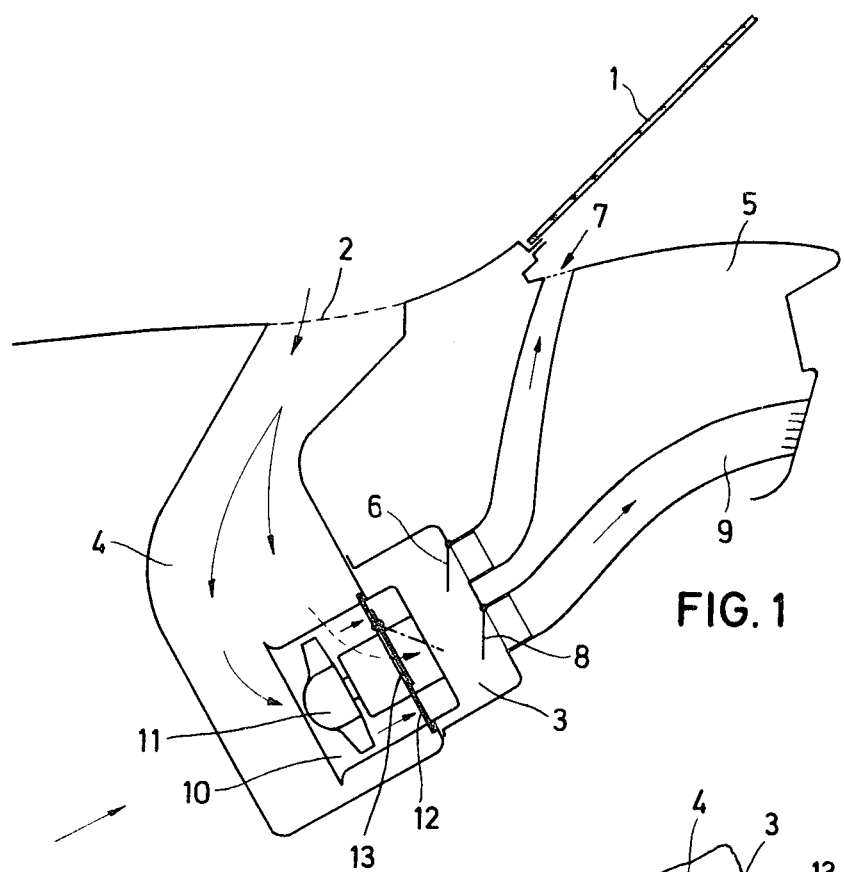

United States Patent
Morchen et al.

[15] 3,638,551
[45] Feb. 1, 1972

[54] FRESH AIR DEVICE FOR POWER VEHICLES

[72] Inventors: Wolfgang Morchen; Wolf Heinrich Hucho; Lutz Joachim Janssen, all of Wolfsburg, Germany

[73] Assignee: Volkswagenwerk Aktiengesellschaft, Wolfsburg, Germany

[22] Filed: Mar. 31, 1970

[21] Appl. No.: 24,070

[30] Foreign Application Priority Data

Apr. 1, 1969 Germany .....................P 19 16 638.2

[52] U.S. Cl. ..............................................................98/2.16
[51] Int. Cl. ......................................................B60h 1/24
[58] Field of Search .................98/2.05, 2.06, 2.07, 2.08, 98/2.09, 2.6

[56] References Cited

UNITED STATES PATENTS

| | | | |
|---|---|---|---|
| 3,208,368 | 9/1965 | Perzs | 98/2.07 |
| 3,329,078 | 7/1967 | Castelet | 98/2.07 |
| 3,387,549 | 6/1968 | Castelet | 98/2.07 |

*Primary Examiner*—Meyer Perlin
*Attorney*—Watson, Cole, Grindle & Watson

[57] ABSTRACT

A fresh air ventilator for power vehicles mounted below the windshield of the vehicle having an air inlet channel leading to a fan blower connected through flap valves to two outlet vents, one directed toward the inside of the windshield and the other into the interior of the vehicle.

4 Claims, 3 Drawing Figures

PATENTED FEB 1 1972 3,638,551

INVENTORS
W. Morchen
W. H. Hucho
L. J. Janssen
By Watson, Cole, Grindle & Watson
Attys.

FRESH AIR DEVICE FOR POWER VEHICLES

This invention relates to a fresh air ventilator for power vehicles in which inlet openings for the ventilator are provided in such a way that the movement of the vehicle will add to a fan blower for directing fresh air into the inside of a power vehicle.

In known structures of this type the fan blower is mounted directly in the inlet channel and aids in directing the fresh air into the vehicle and mainly when the vehicle is in motion. It is an object of the present invention to provide easy access for the fresh air to be directed into a vehicle body and furthermore the device for projecting the airstreams has flap valves provided which are opened as soon as the pressure force is greater than the force directing the air into the vehicle.

The invention proceeds from the problem to increase the amount of flow without increasing the cost of the ventilation.

The invention therefore has for an object to mount the power fan in a line for the entry channel and to provide the power fan with flap valves which may be opened by the pressure force of the directed airstream when the pressure force is greater than the pressure behind the fan. A further object of the invention resides in the provision of mounting the power fan in an inlet channel of an elongated configuration in a shell-like sheet metal structure whereby the flap valves will be operative in the forced airstream. The flap valves may be composed of an artificial material, as for example rubber with sail-like form and are secured in the sheet metal wall. The flap valves are made as thin as possible and to strengthen the valve plates they can be mounted in rigid rims or provided with ribs. By means of the invention, the inlet channels and the fan can be provided as a small unit. Since the fan unit and its surrounding channel member are provided adjacent to each other, there is thus a compact structure produced which can be easily mounted under a dashboard compartment. Also, the fan may be switched off altogether, if desired, or may be switched off only while the vehicle is in motion.

Figure 2:
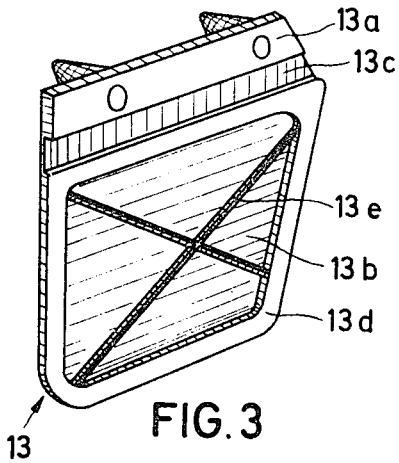
Figure 3:
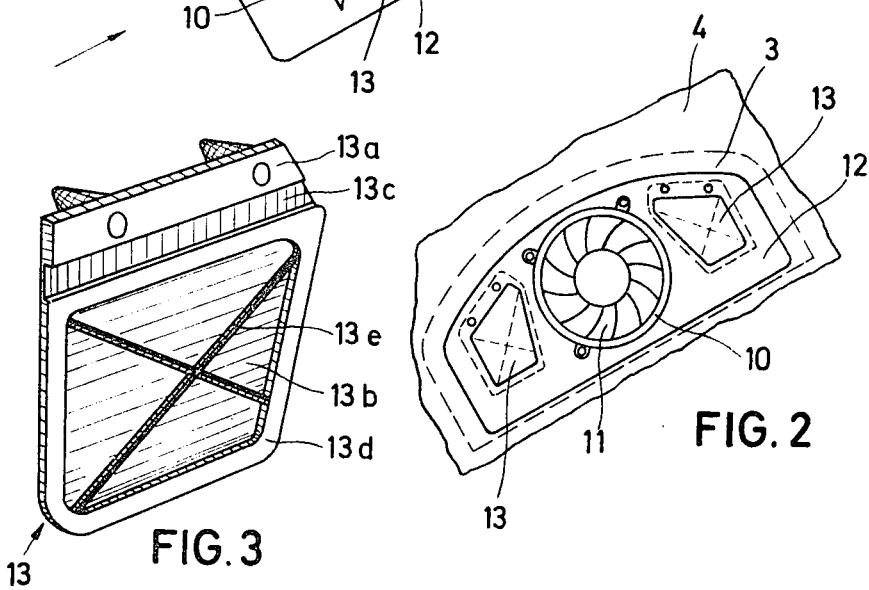

Further objects will be apparent from the following description when considered in connection with the accompanying drawing in which;

FIG. 1 is a diagrammatic side view in section of the ventilating device and system, FIG. 2 is a front elevation of the device taken in the direction of the outside arrow in FIG. 1, and FIG. 3 is a perspective view of a flap for the valve.

The airpath below the windshield 1 of the body of a vehicle flows from a slot or gridlike air opening 2, into a distributor casing or box 3 by means of an inlet channel 4. From the distributor box 3 one or more regulatable channels are connected to grids or grates 7 near the windshield 1 and provided with flap valves 6 and 8, associated with the outlet conduits 9 directed to the inner space of the body. In front of the distributor casing 3, the inlet conduit 4 will be enlarged to an outlet casing of approximately rectangular cross section on both sides below the instrument board. In the middle of the casing there is an fan blower 11 which is mounted within a tubular member 10 which forms a surrounding inlet element on both sides of the channel 4 for the air inlet. The tube member 10 with the fan blower 11 is seated in a shell plate 12 of sheet metal with openings therein which are controlled by flap valves 13 preferably composed of an artificial material as for example, rubber and the like flexible material.

The flap valve 13 will prevent the backflow of fresh air from the chamber 3 of the casing and such valves will open in the direction of the airstream by the airflow pressure only when the pressure in the inlet chamber 4 is higher than the pressure developed by the fan blades 11 in the distributor casing 3. The flap valves 13 are mounted by means of a bar 13a, FIG. 3, which has a comparatively large cross section and having a part 13b which is adapted to swing outwardly due to the flexible portion 13c. The construction is uncomplicated and can be produced in an inexpensive manner so that the forced draft device can be operated without difficulty in view of the fact that the flap valves 13 will be automatically operated by air pressure.

We claim:

1. Fresh air ventilation arrangement for motor vehicles having an inflow channel and an outflow channel, a partition plate mounted within said inflow channel, an air conveyor fan unit mounted on said plate for directing airflow therethrough, and nonreturn outflow valves provided in said plate on opposite sides of said fan unit whereby air may flow through said fan unit into said outflow channel when the airflow pressure on the outflow side of said plate is greater than the airflow pressure on the inflow side of said plate, thereby serving to close said valves, and air may flow through said valves into said outflow channel when the airflow pressure on the outflow side of said plate is less than the airflow pressure on the inflow side of said plate, thereby serving to open said valves.

2. The arrangement according to claim 1 wherein an open tubular member surrounding said fan unit is mounted on said plate.

3. The arrangement according to claim 1 wherein each of said valves comprises resilient nonmetallic flaps.

4. The arrangement according to claim 3 wherein each of said flap valves is provided with a rigid peripheral frame member and reinforcing ribs on the surface of each said flap.

* * * * *